US007873824B2

(12) United States Patent
Johnson et al.

(10) Patent No.: US 7,873,824 B2
(45) Date of Patent: Jan. 18, 2011

(54) METHOD AND APPARATUS FOR REMOTE BIOS CONFIGURATION CONTROL

(75) Inventors: Trent Johnson, Austin, TX (US);
Chandrakant Pandya, Pflugerville, TX (US); Hooi-Min Lim, Austin, TX (US);
Richard Alan Hamersley, Buda, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 815 days.

(21) Appl. No.: 11/757,230

(22) Filed: Jun. 1, 2007

(65) Prior Publication Data

US 2008/0301422 A1  Dec. 4, 2008

(51) Int. Cl.
*G06F 1/24* (2006.01)
*G06F 1/00* (2006.01)
(52) U.S. Cl. ..................................... 713/100
(58) Field of Classification Search ............. 713/1, 713/100
See application file for complete search history.

(56) References Cited

U.S. PATENT DOCUMENTS

| 5,999,476 | A | 12/1999 | Dutton et al. |
| 6,611,912 | B1 | 8/2003 | Maleck et al. |
| 7,149,796 | B2 | 12/2006 | Sanders |
| 7,363,484 | B2* | 4/2008 | Davis et al. .......... 713/100 |
| 7,398,382 | B2* | 7/2008 | Rothman et al. ........ 713/2 |
| 7,467,295 | B2* | 12/2008 | Erickson et al. ........ 713/2 |
| 2005/0060531 | A1* | 3/2005 | Davis et al. .......... 713/2 |
| 2008/0134319 | A1* | 6/2008 | Baker et al. .......... 726/21 |

OTHER PUBLICATIONS

Wikipedia; *Intelligent Platform Management Interface*; http://en.wikipedia.org/wiki/IPMI; Jun. 2005.
Wikipedia; *Open Platform Management Architecture*; http://en.wikipedia.org/wiki/Open_Platform_Management_Architecture; Nov. 2006.
Wikipedia; *OpenManage*; http://en.wikipedia.org/wiki/OpenManage; Jan. 2007.
Wikipedia; *Booting*; http://en.wikipedia.org/wiki/Booting; Jun. 5, 2010*; pp. 1-9.
Wikipedia; *Booting*; http://en.wikipedia.org/wiki/Booting; May 27, 2007**; pp. 1-9.

(Continued)

*Primary Examiner*—Thomas Lee
*Assistant Examiner*—Mohammed H Rehman
(74) *Attorney, Agent, or Firm*—Timothy M. Honeycutt

(57) ABSTRACT

Apparatus and methods for remotely configuring a computer BIOS of a testing computer system are provided. In one aspect, a method of testing is provided that includes establishing an interface between a first computer system and a second computer system. The second computer system includes a computer readable storage device that has a BIOS and a first set of BIOS configuration settings. The first set of BIOS configuration settings is adapted to a first device under test. At least one instruction is sent from the first computer system to the second computer system to enable the second computer system to select a second set of BIOS configuration settings adapted to a second device under test having different electronic characteristics than the first device under test. An electrical test is performed on the second device under test using the second computer system and the second set of BIOS configuration settings.

29 Claims, 3 Drawing Sheets

OTHER PUBLICATIONS

Wikipedia; *Boot image*; http://en.wikipedia.org/wiki/Boot_image; pp. 1-2***.

Ronald LeRoi Burback; *Heterogeneous Systems*; http://infolab.stanford.edu/burback/dadl/node95.html; Dec. 16, 1998; p. 1.

Amar Shan; *Heterogeneous Processing: a Strategy for Augmenting Moore's Law*; LINUX Journal; http://www.linuxjournal.com/article/8368?p.=0,0; Jan. 2, 2006; pp. 1-4.

Wikipedia; *PA-8000*; http://en.wikipedia.org/wiki/PA-8000; pp. 1-8****.

* cited by examiner

METHOD AND APPARATUS FOR REMOTE BIOS CONFIGURATION CONTROL

BACKGROUND OF THE INVENTION

1. Field of the Invention

This invention relates generally to semiconductor processing, and more particularly to apparatus and methods of remotely configuring a testing computer system BIOS.

2. Description of the Related Art

Newly manufactured integrated circuits typically undergo a battery of tests before shipment to computer and other electronics manufacturers or suppliers. One such test consists of inserting the integrated circuit into a test system and running a so-called system level test. For processors, such as microprocessors, a system level test usually involves inserting the microprocessor into a testing computer system, booting and perhaps running some testing software. The chip to be tested is referred to as a "device under test" or DUT.

A typical conventional testing computer system consists of a microcomputer that includes a socket for the microprocessor to be tested, associated memory and control logic (typically on a system board) and a number of peripheral devices that provide input and/or output for the system. The testing computer system typically includes a set of built-in software routines called the basic input/output system (BIOS). The BIOS is a software interface between the system hardware and the operating system software. The BIOS is often referred to as firmware because it has qualities of both software and hardware. Like software, the BIOS is a set of instructions to the computer's microprocessor, or the computer's DUT for a testing computer. Like hardware, the BIOS is commonly coded onto a non-volatile memory such as a ROM (Read Only Memory) or a PROM (Programmable ROM) such as an EPROM (Erasable PROM), an EEPROM (Electrically Erasable PROM), a flash RAM (Random Access Memory) or any other type of memory appropriate for storing BIOS. The BIOS controls several important functions for the testing computer system. For instance, the BIOS performs various functions at power up, including testing memory, inventorying the system, and testing the system.

For a conventional testing computer, the BIOS will be programmed with a default set of configuration settings that are suitable for a particular DUT. For example, a testing computer set up to test a microprocessor ultimately destined for a server, will have BIOS configuration settings appropriate for a server platform microprocessor. Such settings might include particular bus speeds and memory settings. A microprocessor intended for a different platform, such as a mobile device, will sometimes require a different set of BIOS configuration settings.

In conventional testing computer systems, the BIOS is flashed manually and locally for a given computer with some default BIOS configuration settings. Several problems can arise. If a different type of chip requires testing, the BIOS may need alteration to match the new chip's requirements. This usually requires the BIOS to be manually reconfigured prior to boot up with different settings suitable for the new chip. This process can be time consuming for the operator. If there are multiple testing computer systems, there is the possibility that some of the computers have been flashed with BIOS configuration settings that match a particular DUT while others have been flashed with BIOS configuration settings that match another type of DUT. If the operators are unaware of the mixed coding of the various testing computers, the test results for a given lot of DUT's may produce ambiguous results or some DUT's may not undergo correct testing.

The present invention is directed to overcoming or reducing the effects of one or more of the foregoing disadvantages.

SUMMARY OF THE INVENTION

In accordance with one aspect of the present invention, a method of testing is provided that includes establishing an interface between a first computer system and a second computer system. The second computer system includes a computer readable storage device that has a BIOS and a first set of BIOS configuration settings. The first set of BIOS configuration settings is adapted to a first device under test. At least one instruction is sent from the first computer system to the second computer system to enable the second computer system to select a second set of BIOS configuration settings adapted to a second device under test having different electronic characteristics than the first device under test. An electrical test is performed on the second device under test using the second computer system and the second set of BIOS configuration settings.

In accordance with another aspect of the present invention, a method of testing is provided that includes establishing a network between a first computer system and a plurality of testing computer systems. Each of the plurality of testing computer systems includes a computer readable storage device that has a BIOS and a first set of BIOS configuration settings. The first set of BIOS configuration settings is adapted to a first device under test. At least one instruction is sent from the first computer system to at least one of the plurality of testing computer systems to enable the at least one of the testing computer systems to select a second set of BIOS configuration settings adapted to a second device under test that has different electronic characteristics than the first device under test. An electrical test is performed on the second device under test using the at least one of the testing computer systems and the second set of BIOS configuration settings.

In accordance with another aspect of the present invention, a method of booting a testing computer system is provided. The test computer system includes a computer readable storage device that has a BIOS and a first set of BIOS configuration settings. The first set of BIOS configuration settings is adapted to a first device under test. The method includes sending an instruction from another computer system to the testing computer system to enable the testing computer system to boot with a second set of BIOS configuration settings adapted to a second device under test having different electronic characteristics than the first device under test set. The testing computer is booted using the second set of BIOS configuration settings.

In accordance with another aspect of the present invention, a computer network is provided that includes a testing computer system that has a computer readable storage device that includes a BIOS and a first set of BIOS configuration settings. The first set of BIOS configuration settings is adapted to a first device under test. The testing computer system is adapted to test the first device under test and a second device under test that has different electronic characteristics than the first device under test. A computer system is provided that includes a computer readable storage device that has code operable to instruct the testing computer system to select the first set of BIOS configuration settings or a second set of BIOS configuration settings adapted to the second device under test. An interface between the testing computer system and the computer system is provided.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
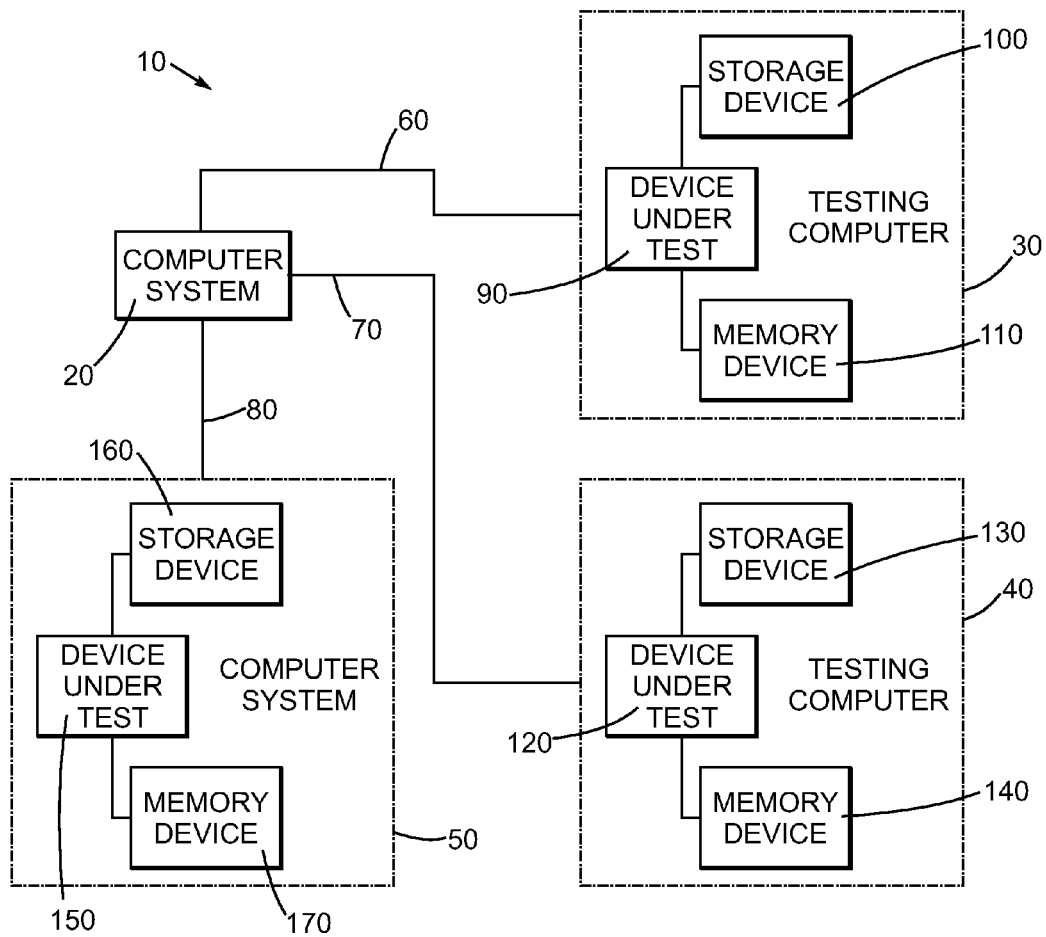
FIG. 1 is a schematic view of an exemplary network that enables remote configuration of a BIOS in one or more computer systems.

In the drawings described below, reference numerals are generally repeated where identical elements appear in more than one figure. Turning now to the drawings, and in particular to FIG. 1, therein is shown a schematic view of an exemplary network 10 that enables remote configuration of a BIOS in one or more computer systems. In particular, a host cell or computer system 20 is networked with one or more testing computers 30, 40 and 50. Interfaces 60, 70 and 80 are provided between the host computer 20 and the testing computers 30, 40 and 50. The interfaces 60, 70 and 80 may be hard-wired, wireless or some combination of the two as desired. The host computer system 20 may be a personal computer, a server or virtually any other type of computing system. The testing computers 30, 40 and 50 may be configured as personal computers, servers, some form of custom-made diagnostic computer system or virtually any other computer system suitable for testing a so-called device under test (DUT). A DUT may be, for example, a microprocessor, a graphics processor, an application specific integrated circuit or virtually any other type of integrated circuit that requires some form of system level testing.

Turning first to the testing computer 30, a DUT 90 is electrically connected to a computer readable storage device 100 (storage device) and a memory device 110. The storage device 100 is provided with a default configuration BIOS and may be implemented as a memory device or some other type of storage device. If implemented as a memory device, the storage device 100 may be a non-volatile memory device, such as a ROM (Read Only Memory) or a PROM (Programmable ROM) such as an EPROM (Erasable PROM), an EEPROM (Electrically Erasable PROM), a flash RAM (Random Access Memory) or any other type of memory appropriate for storing BIOS. Optionally, the storage device 100 may consist of any of the aforementioned non-volatile devices tied to another memory device, such as a RAM (Random Access Memory). The RAM may hold particular configuration settings for the BIOS. The memory device 110 may be a random access memory (RAM) or other type of memory device as desired. The skilled artisan will appreciate that the testing computer 30 may include other storage devices, chip sets, ports and other devices used in computer systems.

The testing computer 40 is shown with a device under test 120 and may be provided with a storage device 130 and a memory device 140. Similarly, the testing computer 50 is shown with a device under test 150 and may be provided with a storage device 160 and a memory device 170. The storage devices 130 and 160 of the testing computers 40 and 50 may be provided with respective default configuration BIOS's.

The default configuration BIOS consists of instructions that perform various functions for the testing computer 30, usually, though not exclusively, at power up. The default BIOS instructions are default in that the instruction set is appropriate for a particular type of DUT. Upon power up, the default BIOS will perform actions such as configuring the bus speed suitable for the memory device 110 and the DUT 90, setting the boot sequence for the testing computer 30 and making configuration settings appropriate for the speed and timing characteristics of the memory device 110.

As discussed in the Background section hereof, a difficulty associated with conventional testing computer systems using a default BIOS configuration is the inefficiency associated with testing a DUT that is mismatched to the default BIOS configuration. For example, if the default BIOS in the storage device 100 of the computer system 30 is appropriate for the DUT 90, but a decision is made to begin testing of another type of DUT that has different operating characteristics than the DUT 90, the conventional technique would require a manual pre-boot BIOS configurations settings changes for the storage device 100.

In contrast to the conventional approach, the network 10 enables the operator to remotely modify the configuration settings of the BIOS in any of the testing computers 30, 40 or 50 to match the characteristics of a DUT that might not be appropriate for the default BIOS. If it is desired to instruct one or more of the testing computers 30, 40 or 50 to alter their BIOS configurations for something other than a default DUT, the host computer 20 sends appropriate instructions to the computers 30, 40 and 50 so that upon initial boot up, the storage devices 100, 130 and 160 and the BIOS programs stored therein will initially check for the presence of a BIOS override instruction from the host computer 20. If such an override instruction from the host computer 20 has been sent, then the BIOS in each of the testing computers 30, 40 and 50 will boot using altered BIOS settings sent from the host computer 20 that are appropriate for the particular DUT being examined. In this set up, the host computer 20 is provided with appropriate software that not only enables the operator to send override instructions to the particular testing computers 30, 40 and 50 but also to send follow up BIOS configuration setting changes appropriate for particular DUT's after the initial delivery of the BIOS override instructions.

Figure 2:
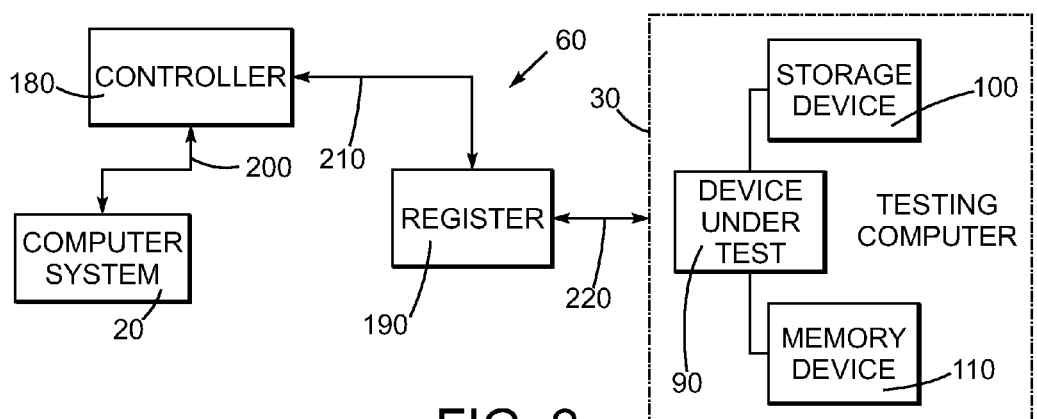
FIG. 2 is a schematic view of an interface between two computer systems.

A more specific exemplary physical implementation of the host computer 20, the testing computer 30 and the interface 60 between the two computer systems 20 and 30 may be understood by referring now to FIG. 2. Here, the interface 60 consists of a controller 180, a storage device or register 190, an interface 200 between the host computer 20 and the controller 180, an interface 210 between the controller 180 and the register 190, and an interface 220 between the register 190 and the computer system 30. The controller 180 is designed to interface and receive instructions from the host computer 20 and pass those instructions to the register 190. The controller may be a computer system, an application specific integrated circuit or other type of electronic device capable of providing a data interface between the host computer 20 and the register 190. The register 190 is a storage device that is operable to receive instructions from the host computer 20 via the controller 180 and deliver those instructions in a form readable by the testing computer 30 by way of the interface 220. Thus, the register 190 is writeable from the controller 180 and readable by the testing computer 30. The register 190 may be an application specific integrated circuit or other type of storage device capable of read and write operations. The interfaces 200, 210 and 220 may be wired or wireless as desired. In an exemplary embodiment, the interface 200 may consist of an ethernet connection, the interface 210 may consist of a bus, such as an I$^2$C bus, and the interface 220 may consist of a so-called low pin count bus.

In operation, instructions from the host computer 20 to either use or override the default BIOS in the storage device 100 are sent to the register 190 via the controller 180. Upon initial power up of the testing computer 30, the BIOS in the storage device 100 reads the bits in the register 190 and if the default BIOS configuration override bit(s) is set, the storage device 100 will then look to the register for various BIOS configuration setting changes and implement those changes. If necessary, the alternative BIOS settings may result in direct temporary program changes in microcode stored on the DUT 90. The testing computer 30 may be powered up and down separately from and at the instruction of the host computer 20.

Figure 3:
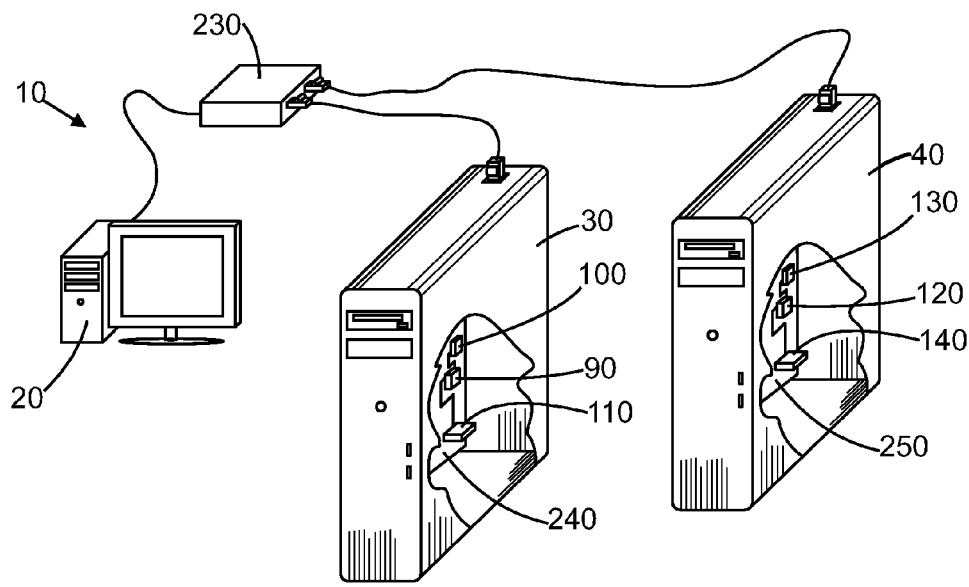
FIG. 3 is a pictorial view of an exemplary embodiment of a network that enables remote configuration of a BIOS in one or more computer systems.

An embodiment of the network 10 may be understood by referring now to FIG. 3, which is a pictorial view showing the host computer 20 depicted as a personal computer and two testing computers 30 and 40 both implemented as personal computers. In this embodiment, the interfaces 60 and 70 between the host computer 20 and the testing computers 30 and 40 may consist of an ethernet network with a switching device 230, such as a router, interposed between the host computer 20 and the testing computers 30 and 40. The sides of the testing computers 30 and 40 are partially cut away to reveal circuit boards 240 and 250. The circuit board 240 of the testing computer 30 is fitted with the DUT 90, the storage device 100 and the memory device 110. The board 250 of the testing computer 40 is similarly fitted with the DUT 120, the storage device 130 and the memory device 140. The embodiment depicted in FIG. 3 is designed to operate as generally described above in conjunction with the embodiment depicted in FIG. 1. Optionally, the interface 60 depicted in FIG. 2 may be used in between the host computer 20 and the testing computers 30 and 40 of the embodiment of FIG. 3.

Figure 4:
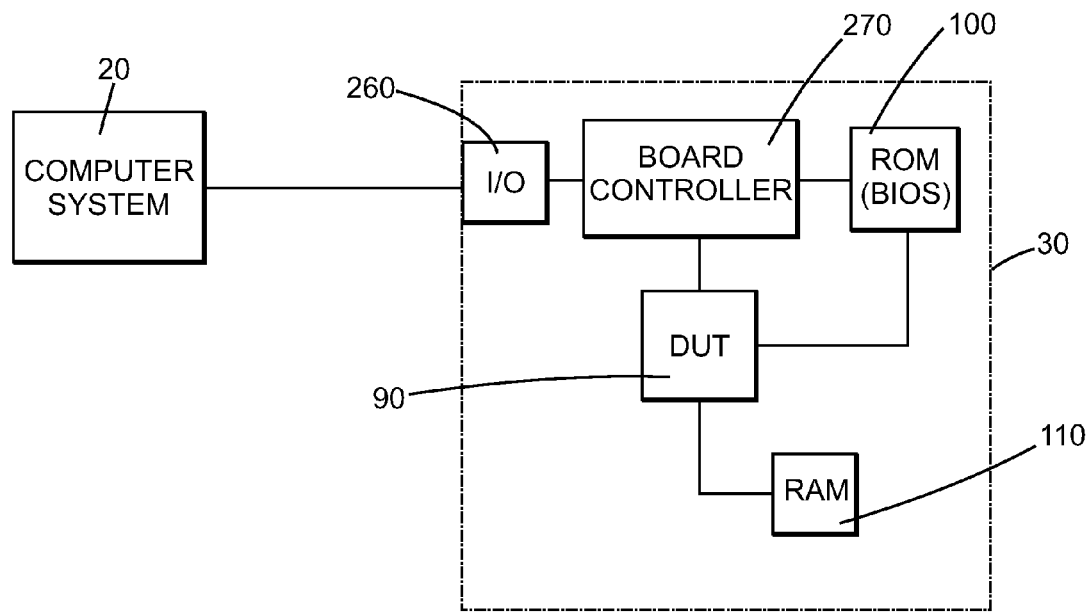
FIG. 4 is another schematic view of an interface between two computer systems.

A more detailed illustration of an embodiment of the host computer 20 connected to one of the testing computers, such as the testing computer 30, is depicted in FIG. 4. As described elsewhere herein, the testing computer 30 includes a DUT 90, a storage device 100 that holds a BIOS and a memory device 110, which may be a random access memory. The computer system 30 includes an I/O port 260 that is designed to electronically interface with the host computer 20 by way of the interface 60. Signals to and from the I/O port 260 are routed to the storage device 100 and the DUT 90 by way of a board controller 270, which may be a single integrated circuit or a chip set as desired. The testing computer 30 may include a myriad of other electronic components that are normally present in a computer system, but which are not shown for simplicity of illustration.

Figure 5:
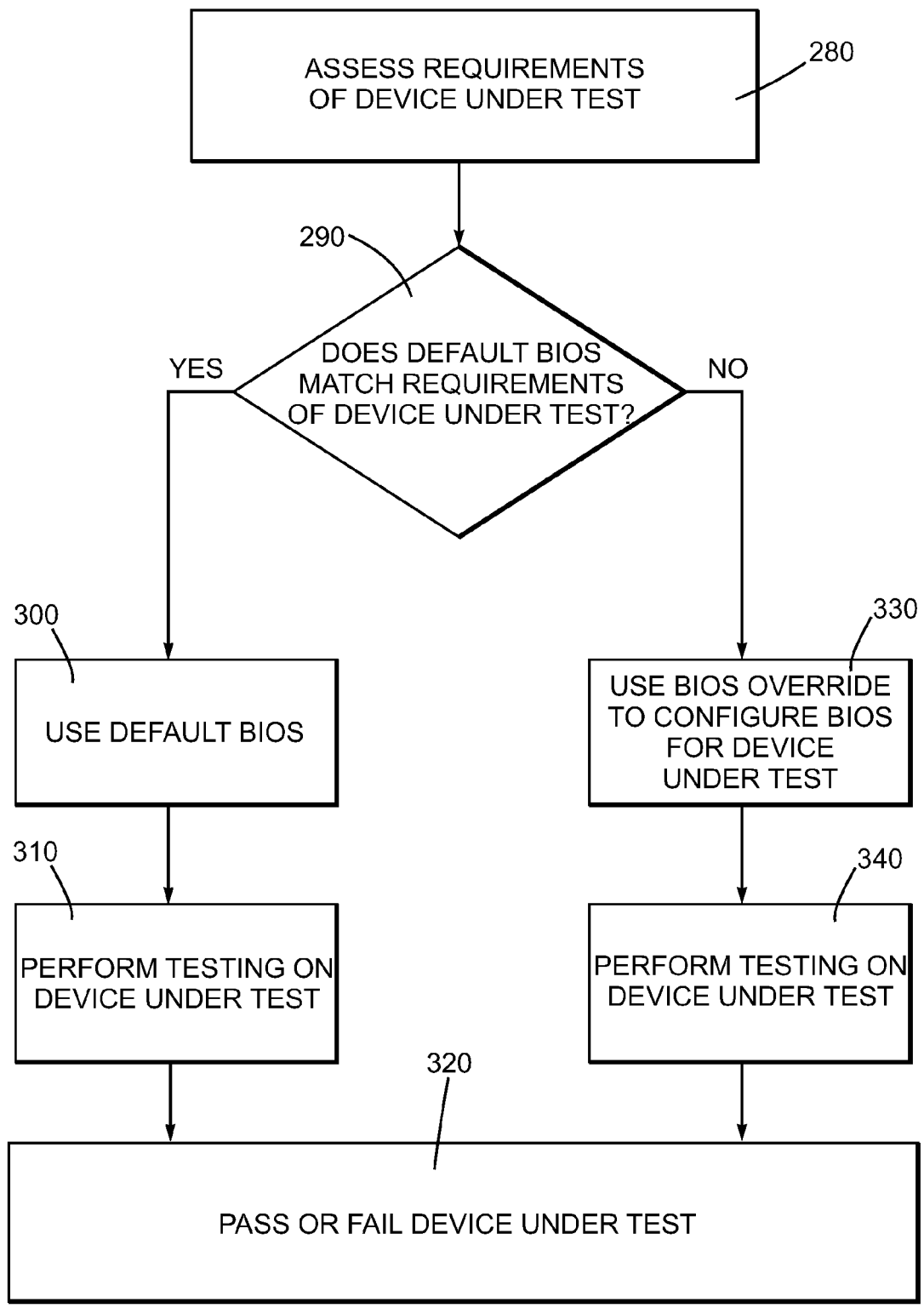
FIG. 5 is a flow chart of an exemplary method of testing using a remote configuration of a BIOS in a computer.

An exemplary process flow may be understood by referring now to FIG. 5. The description of the method shown in FIG. 5 will be described in conjunction with FIG. 1. Assume for the purposes of illustration that the host computer 20 is connected to a single testing computer 30 by way of the interface 60. Initially, and as shown in step 280, the requirements of the particular DUT are initially assessed. In this regard, the memory speed requirements, bus speed requirements and other types of configuration parameters of the DUT are examined and assessed. For example, the DUT may be appropriate for a mobile computing platform. Next in step 290, the requirements of the DUT are compared to the default BIOS loaded into the storage device 100 of the testing computer 30. If the requirements of the DUT 90 match the default BIOS settings, then the host computer 20 instructs the BIOS in the storage device 100 to use the default BIOS settings as in step 300 and electronic testing is performed on the DUT 90 using those default BIOS settings as in step 310. Next, and in step 320, the DUT 90 is deemed to pass or fail the electronic testing performed using the default BIOS configuration settings.

However, if at step 290, it is determined that the requirements of the DUT 90 do not match the default BIOS settings of the BIOS in the storage device 100, then at step 330 the host computer 20 instructs the BIOS in the storage device 100 to accept override and reprogramming so that the BIOS settings will be appropriate for the DUT 90. Next, and as shown at step 340, electronic testing is performed on the DUT 90 using the overridden BIOS settings. Then at step 320, the DUT 90 is deemed to pass or fail whatever electronic testing was performed on the DUT 90 in the testing system 30.

The foregoing description focused on a host computer 20 and a single testing computer 30. However, the skilled artisan will appreciate that the same process flow may be followed in circumstances where the host computer 20 is networked with multiple testing computers, each testing the same or different types of DUT's and each requiring perhaps different types of BIOS override instructions depending on the particular requirements of the individual DUT and the default BIOS programming loaded in the individual testing computers.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of testing, comprising:
   establishing an interface between a first computer system and a second computer system, the second computer system including a computer readable storage device having a BIOS and a first set of BIOS configuration settings, the first set of BIOS configuration settings adapted to a first device under test;
   sending at least one instruction from the first computer system to the second computer system to enable the second computer system to select a second set of BIOS configuration settings adapted to a second device under test having different electronic characteristics than the first device under test; and
   performing an electrical test on the second device under test using the second computer system and the second set of BIOS configuration settings.

2. The method of claim 1, wherein the establishing an interface between a first computer system and a second computer system comprises establishing a wireless interface.

3. The method of claim 1, wherein the establishing an interface between a first computer system and a second computer system comprises establishing a wired interface.

4. The method of claim 1, wherein the establishing an interface between a first computer system and a second computer system comprises electrically coupling a storage device between the first computer system and the second computer system, the storage device being writeable by the first computer system and readable by the second computer system and operable to store the at least one instruction.

5. The method of claim 1, wherein the establishing an interface between a first computer system and a second computer system comprises electrically coupling a register between the first computer system and the second computer system, the register being writeable by the first computer system and readable by the second computer system and operable to store the at least one instruction.

6. The method of claim 1, wherein the electrical test comprises a system level test.

7. The method of claim 1, wherein the first set of BIOS configuration settings are adapted to a first microprocessor.

8. The method of claim 7, wherein the second set of BIOS configuration settings are adapted to a second microprocessor.

9. A method of testing, comprising:
  establishing a network between a first computer system and a plurality of testing computer systems, each of the plurality of testing computer systems including a computer readable storage device having a BIOS and a first set of BIOS configuration settings, the first set of BIOS configuration settings adapted to a first device under test;
  sending at least one instruction from the first computer system to at least one of the plurality of testing computer systems to enable the at least one of the testing computer systems to select a second set of BIOS configuration settings adapted to a second device under test having different electronic characteristics than the first device under test; and
  performing an electrical test on the second device under test using the at least one of the testing computer systems and the second set of BIOS configuration settings.

10. The method of claim 9, comprising sending at least one instruction from the first computer system to another of the plurality of testing computer systems to enable the another of the testing computer systems to select a second set of BIOS configuration settings adapted to a second device under test having different electronic characteristics than the first device under test.

11. The method of claim 10, comprising performing an electrical test on a third device under test using the another of the testing computer systems and the second set of BIOS configuration settings.

12. The method of claim 9, wherein the establishing a network comprises establishing a wireless network.

13. The method of claim 9, wherein the establishing a network comprises establishing a wired network.

14. The method of claim 9, wherein the electrical test comprises a system level test.

15. The method of claim 9, wherein the first set of BIOS configuration settings are adapted to a first microprocessor.

16. The method of claim 15, wherein the second set of BIOS configuration settings are adapted to a second microprocessor.

17. A method of booting a testing computer system including a computer readable storage device having a BIOS and a first set of BIOS configuration settings, the first set of BIOS configuration settings adapted to a first device under test, comprising:
  sending an instruction from another computer system to the testing computer system to enable the testing computer system to boot with a second set of BIOS configuration settings adapted to a second device under test having different electronic characteristics than the first device under test set; and
  booting the testing computer using the second set of BIOS configuration settings.

18. The method of claim 17, wherein the sending an instruction from another computer system to the testing computer system comprises a wireless transmission.

19. The method of claim 17, wherein the sending an instruction from another computer system to the testing computer system comprises a wired transmission.

20. The method of claim 17, wherein the first set of BIOS configuration settings are adapted to a first microprocessor.

21. The method of claim 20, wherein the second set of BIOS configuration settings are adapted to a second microprocessor.

22. A computer network, comprising:
  a testing computer system including a computer readable storage device having a BIOS and a first set of BIOS configuration settings, the first set of BIOS configuration settings adapted to a first device under test, the testing computer system adapted to test the first device under test and a second device under test having different electronic characteristics than the first device under test;
  a computer system including a computer readable storage device having code operable to instruct the testing computer system to select the first set of BIOS configuration settings or a second set of BIOS configuration settings adapted to the second device under test; and
  an interface between the testing computer system and the computer system.

23. The computer network of claim 22, wherein the computer system comprises a personal computer.

24. The computer network of claim 22, comprising a plurality of testing computer systems, the interface being between the computer system and the plurality of testing computer systems.

25. The computer network of claim 22, wherein the computer readable storage device of the testing computer system comprises a non-volatile memory.

26. The computer network of claim 22, wherein the interface comprises a wireless interface.

27. The computer network of claim 22, wherein the interface comprises a wired interface.

28. The computer network of claim 22, wherein the interface comprises a controller electrically coupled to the computer system and storage device coupled between the controller and the testing computer system, the storage device being writeable by the computer system and readable by the testing computer system.

29. The computer network of claim 28, wherein the storage device comprises a register.

* * * * *